July 10, 1956   W. F. COLLINS   2,753,676
PICK-UP AND FEED FOR HARVESTER
Filed July 8, 1953   3 Sheets-Sheet 1

Inventor:
William F. Collins
Paul O. Pippel
Atty.

July 10, 1956  W. F. COLLINS  2,753,676
PICK-UP AND FEED FOR HARVESTER
Filed July 8, 1953  3 Sheets-Sheet 3

Inventor:
William F. Collins
Paul O. Pipper
Atty.

United States Patent Office 2,753,676
Patented July 10, 1956

2,753,676
PICK-UP AND FEED FOR HARVESTER
William F. Collins, Downers Grove, Ill., assignor to International Harvester Company, a corporation of New Jersey Application July 8, 1953, Serial No. 366,649
3 Claims. (Cl. 56—345)

This invention relates to field harvesters and more specifically to forage harvesters.

A general object of the invention is to devise a novel, simple, and compact forage harvester for harvesting wide swaths of hay or the like directly from the field.

A more specific object of the invention is to devise a field forage harvester which incorporates a leading novel forward combination rake and pickup for condensing a wide swath and delivering it into a narrow throat of the harvester.

A further object of the invention is to devise a harvester of the type described of extremely short depth to reduce to the minimum the distance of travel of the crop from the ground to the cutter blower.

These and other objects of the invention will become more apparent from the specification and the drawings wherein.

Figure 1:
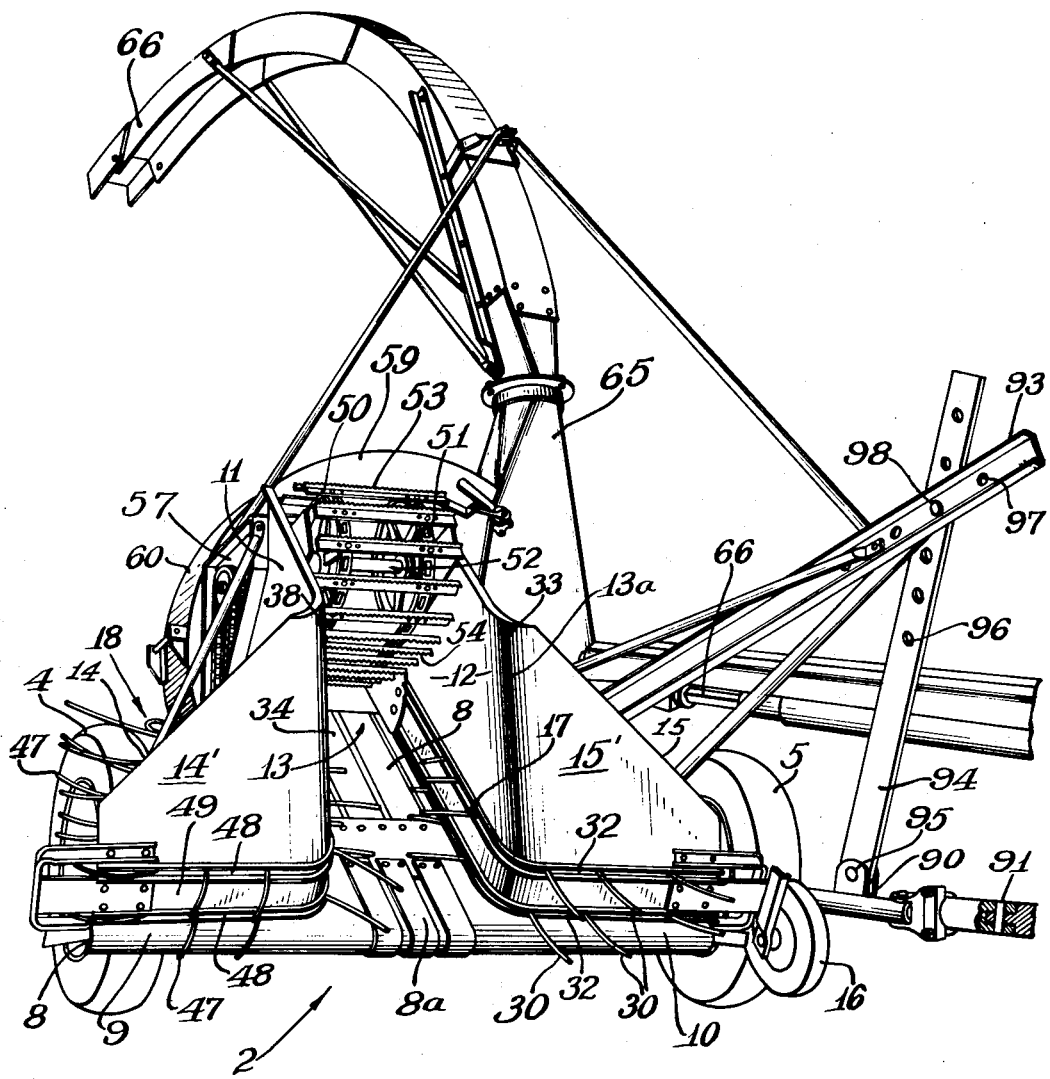
Figure 1 is a front perspective view of the novel harvester.

Describing the invention in detail, the harvester generally designated 2 comprises a wheeled framework 3 including spaced wheels 4 and 5 connected through axle carriers 6 to the framework 3, the framework 3 comprising a beam member 7 extending fore and aft of the machine at each side thereof and at its rear carried from the member 6 and at its forward end connected to a diagonal platform panelling or bottom wall 8 which has at its forward end a platform structure with a center portion 8ª and lateral platform extensions 9 and 10 extending the width of the machine, the platform 8 extending from its lower forward end diagonally upwardly rearwardly and providing a crop deck intermediate its ends between laterally spaced substantially vertical generally parallel upright panels 11 and 12 defining opposite sides of a throat or fore and aft extending body or guideway generally indicated 13, the lower ends of the panels 11 and 12 being suitably connected to the platform member 8 and at the forward open end 13ª of the throat and their forward extremities being laterally bent away from each other to provide lateral panel extensions or web portions 14 and 15, respectively, upstanding from the leading end 31 (Figure 3) of the machine and sloping upwardly and forwardly and providing crop guide and compacting forwardly facing surfaces 14' and 15' sloping downwardly and rearwardly at an acute angle to the ground.

The panel 15 and adjacent portion 10 of the platform 8 adjustably carry a ground engaging guide wheel structure 16 which is adapted to run along the ground and maintain the leading end of the machine at a predetermined height above the ground level.

At each side of the throat 13 are disposed combination raking, conveying and gathering endless chain mechanisms of substantially identical construction and identified 17 and 18, respectively.

The unit 17 comprises three sprockets 19, 20 and 21, the sprockets 19 and 20 being disposed behind the panel portion 15, the sprocket 19 being located adjacent to the outer lateral extremity of the panel 15 and the sprocket 20 being disposed at the corner formed between the panel sections 12 and 15. The sprockets 19 and 20 are suitably mounted rotatably on upright axes on associated spindle assemblies 22 and 23 respectively, the spindle assemblies being suitably mounted, as by fastening, upon the platform 8. The sprocket 21 is keyed to a shaft 24 which is mounted in a bearing 25 carried by the panel 8 and the shaft 24 with the sprocket 21 is positioned laterally outwardly from the adjacent panel 12 and rearwardly of the sprockets 19 and 20. An endless chain 26 is trained about the sprockets 19, 20, and 21 and provides a first rectilinear length 27 generally parallel to the wall section 15 which extends substantially perpendicular to the line of draft of the unit 2. Chain 26 provides a further diagonal second length 28 extending between sprockets 20 and 21 in back of the panel portion 12 which extends generally parallel to the line of draft of the unit, the length 28 extending rearwardly from sprocket 20 in outboardly diverging relationship with respect to the panel section 12. Chain 26 also provides a return length 29 which extends between the sprockets 21 and 19 and interconnects with the lengths 28 and 27. It will be noted from a consideration of Figure 2 that the chain has a somewhat triangular path of travel and operates in a plane generally parallel to the bottom wall. The chain has a plurality of outstanding resilient tynes or fingers 30, 30 secured thereto and these are adapted to pass through continuous slots 32, 32 which are formed and extend from the lateral extreme of the panel 15 around the corner 33 and along the lower edge of the panel 12 to its rear extremity. It will be observed from a consideration of Figures 1 and 2 that the fingers 30, 30 as they leave the run 29 and move in an arc about the sprocket 19 they whip fast to the leading side 31 of the machine until they are moving in the run 27. This fast whipping motion around the sprocket 19 slings the crop engaged by the fingers laterally toward the throat 13 so that all of the crop is not dragged by the fingers moving along the run 27 only that which is necessary. It will be seen from a consideration of Figures 1 and 2 that as the fingers enter around the sprocket 20 they whip around the corner 33 and again sling the material along the center section 34 of a platform into the throat 13. In view of the inclination of the chain length 28 the fingers gradually disappear through the panelling 12 and withdraw from the crop.

Figure 3:
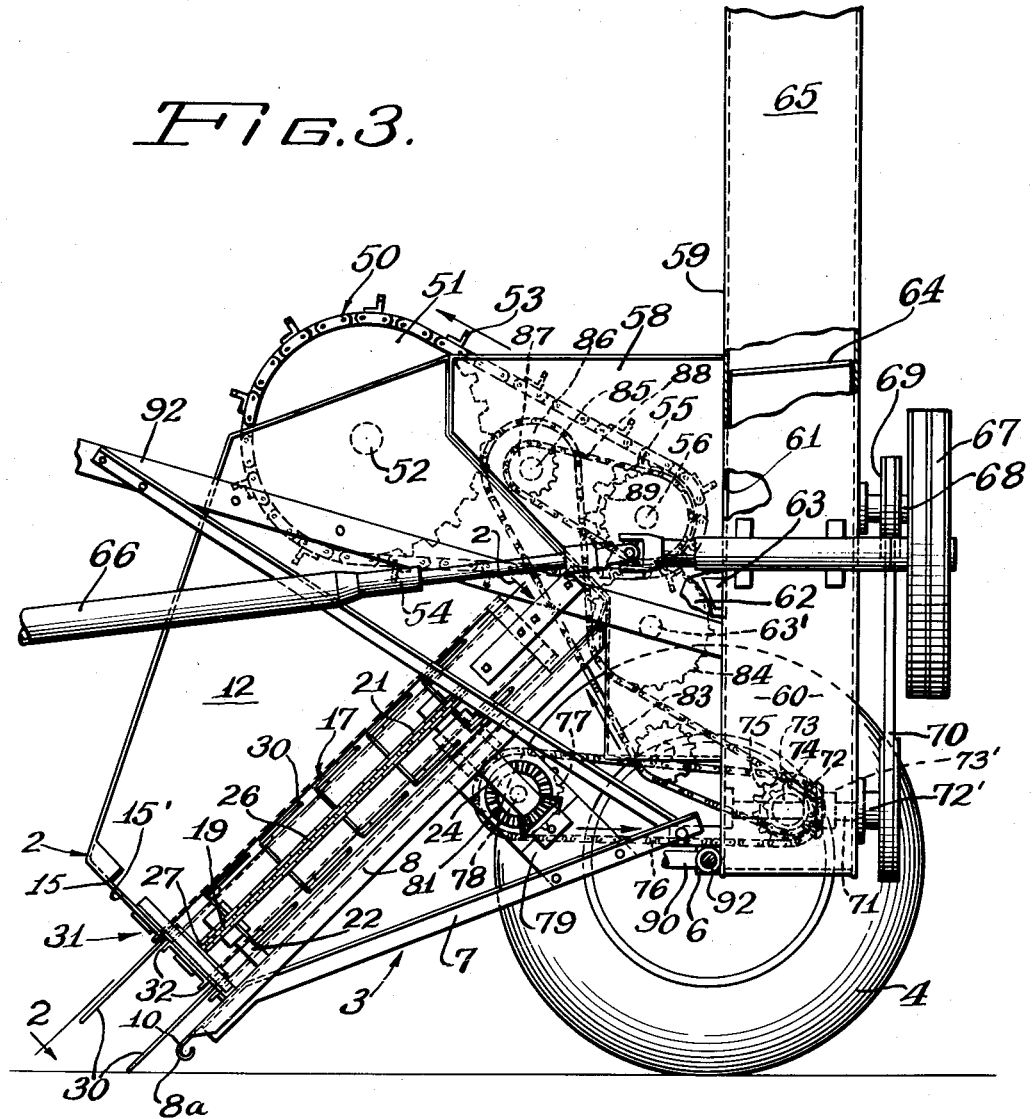
Figure 3 is an enlarged side elevational view of the novel forage harvester.

Similarly the unit 18 comprises three sprockets 35, 36, and 37 disposed in a triangular arrangement with the sprockets 35 and 36 disposed in back of the panel section 14, the sprocket 35 located at the corner 38 formed between the panelling 11 and web 14 and the sprocket 36 disposed adjacent to the lateral outboard extremity of the panel 14 and the sprocket 37 disposed rearwardly of the sprockets 35 and 36 adjacent to the rear extremity of the panel 11 and spaced outboardly thereof. The sprocket 35 is suitably supported rotatably on an upright spindle mounting 39 carried by the platform 8 and the sprocket 36 is rotatably mounted on an upright spindle assembly 40 also carried by the platform 8. The sprocket 37 is keyed to a shaft 41 rotatively bearing-supported from the panel 8 in the same manner as the shaft 24 of the sprocket 21 of the assembly 17. The sprockets 35, 36 and 37 have trained thereabout an endless chain 42 which has a first rectilinear length 43 running generally parallel in back of the wall portion 14 between the sprockets 35 and 36, a second portion or length 44 disposed behind the wall portion 11 in diverging relationship thereto in the aft or rearward direction, and a return portion 45 extending between sprockets 37 and 36 and interconnecting the lengths 43 and 44. The chain 42 also has fixed thereto a plurality of longitudinally spaced fingers or rake tynes 47, 47 which sweep through vertically spaced slots 48, 48 above and below a stripper-bar 49, the slots and the stripper-bar running along and formed in the lower portion of the wall 14 and around the corner 38 and along the lower portion of the wall 11 from the front to the rear extremities thereof and the same as the slots 32. The fingers 47, of course, function the same as the fingers 30 and rapidly whisk about the sprocket 36 and along the length 43 move in raking position to the ground as best seen in Figure 3. The action of fingers 47 along the length 43, is similar to that of the fingers 30, 30 along the length 27 to rake the wide swath of cut hay or the like upon the ground to a position in front of the throat 13. As each finger assembly 47 moves about the sprocket 35 it is whipped around the corner 38 at such speed as to sling the material into the throat 13 and up the incline of the platform. It will be seen that along the length 44 of the chain 42 the fingers are caused to gradually disappear through the wall 11 in disengaging relationship with the crop.

The throat structure 13 is provided between the rear extremities of the wall portions 11 and 12 with an undershot conveyor 50 which comprises a sprocketed spider 51 journaled on a shaft 52 carried between the walls 11 and 12. The undershot conveyor comprises a cross-slat type apron 53 having a lower run 54 which is disposed in rearwardly converging relationship to and over the platform portion 34 and passes around a driving spider sprocket assembly 55 which is keyed on a cross-shaft 56 journaled from and extending between upright panels 57 and 58 which are formed as continuations of the wall portions 11 and 12 and connected at their rear extremities to the upright front wall portion 59 of a blower casing 60 and defining a chute leading into the inlet opening 61 of the blower 60.

The lower run 54 of the undershot conveyor passes at its rear extremity over and cooperates with a feed roller 62 which is keyed on a substantially horizontal axis generally on a shaft 63' parallel to the axis of the shaft 56 and journaled from walls 57 and 58. The feed roller 62 delivers the material over a shear bar 63 for cutting by the rotary blower cutter 64 as well known in the art and shown in U. S. Patent 1,769,163. The blower throws the material into a tangential piping 65 which has a directable spout 66 for discharge into a suitable vehicle such as a farm wagon.

The drive for the various components of the machine is herein indicated as comprising a power-take-off shafting 66 which is attachable to the power-take-off of a conventional tractor, the shafting terminating at its rear end in a belt-pulley drive 67 which drives the rotor shaft 68 of the centrifugal cutter blower or crop cutting and delivery unit 64, the shaft 68 being constrained for rotation with a pulley 69 which, through a belt-pulley drive 70, drives a counter-shaft 71 carried by a bearing 72' mounted on the casing 60, the shaft 71 having a bevel gear connection 72 with a cross-shaft 73 carried by suitable bar brackets 73' on the casing 60. The cross-shaft 73 has a pair of sprockets 74 and 75 constrained for rotation therewith, the sprocket 74 driving a chain 76 which is trained about a sprocket 77 which is keyed to a shaft 78 carried on bearings mounted on dependent supports 79, 79 from the platform 8, the shaft 78 has a driving bevel gear connection at 80 and 81 with shafts 41 and 24 of the assemblies 17 and 18 for driving the same as indicated by the arrows.

The sprocket 75 drives a chain 83 which drives a sprocket 84 which is constrained for rotation with the shaft 63' of the feed roller 62, the chain 83 also drives a counter-shaft 85 journaled from the wall portions 57 and 58 through the sprocket 86, keyed to shaft 85, the shaft 85 driving a sprocket 87 which drives a chain 88 which, through a sprocket 89 drives the shaft 56 and the spider assembly 55 keyed thereto thus driving the undershot conveyor apron 50 in the direction shown by the arrow.

Figure 2:
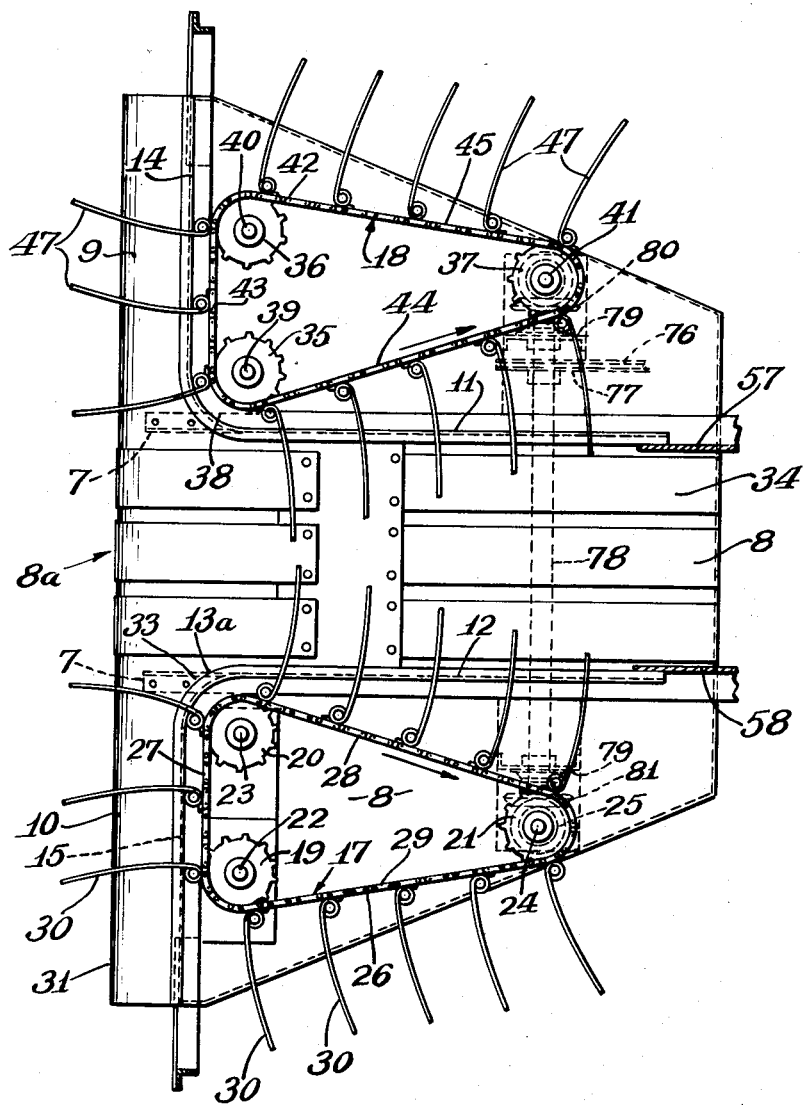
Figure 2 is an enlarged plan view of the combination rake, pickup and conveyor taken substantially on the line 2—2 of Figure 3.

Unit 2 may comprise a drawbar 90 which at one end may have a suitable joint 91 for connection to the drawbar of an associated tractor, and the rear end of the drawbar 90 may be rotatively connected at 92 to the wheel axle assembly 6 and the unit 2 may rotate about the wheels and connection 92 downwardly in harvesting position as shown in Figure 3 or upwardly to transport position as shown in Figure 1 and this may be accomplished by an arm 93 connected to framework 3 which embodies the guideway and the casing 60 and the panelling 12. The arm cooperates with a standard 94 pivotally carried at 95 by the drawbar 90, the upright 94 having a series of perforations 96 which are adapted to register with perforations 97 in the arm 92 for reception of a securing bolt 98 therethrough for holding the unit 2 in any selected position relative to the ground.

What is claimed is:

1. A pick up and feeding apparatus for use with a crop cutting and delivery unit of the type comprising a casing having an upright wall with a forwardly facing crop inlet opening, a throat structure connected to said wall about said opening and extending downwardly and forwardly from said unit and terminating in a leading end adjacent to the ground and comprising a pair of laterally spaced fore and aft extending side walls and an interconnecting bottom wall and a pair of panels extending laterally outwardly of respective side walls at said leading end of said structure, a pair of endless conveyors operatively carried by said structure at opposite sides thereof and each conveyor comprising a first rectilinear length disposed behind the related panel and having outstanding fingers operating in raking relation to the ground through slots in the panel, and each conveyor having a second length with outsanding fingers extending into said throat structure through slots in the adjacent side wall and formed as continuations of the slots in the adjacent panel, said second length of each conveyor extending to adjacent said opening in said casing, and said panels sloping upwardly and forwardlly from said bottom wall and extending over the fingers of the first length of the related conveyor.

2. The invention according to claim 1 and an undershot conveyor supported by said structure between said side walls and having a bottom run positioned over and in direct receiving relation to said second lengths of said conveyors and discharging into said opening.

3. A pick up and feeding apparatus for a crop harvester of the type comprising an ambulant support, a platform and plant guide structure carried thereby and including a pair of laterally spaced upright fore and aft walls and an interconnecting bottom wall defining a narrow throat structure having a leading end adjacent to the ground, a panel extending laterally outwardly of an adjacent side wall at said leading end of the structure, said panel and the related side wall having a continuous elongated slot, an endless conveyor operatively supported on said structure and having outstanding fingers, said conveyor having a first rectilinear length disposed behind said panel with the fingers thereof operating through said slot in the panel ahead thereof for sweeping crops along the ground to said throat, and said conveyor having a second length behind said adjacent side wall with the fingers thereof operating through the slot in said side wall for moving the crop rearwardly into the throat, said panel angled upwardly and forwardly from said bottom wall to provide a forwardly facing crop compacting and guide surface sloping downwardly and rearwardly at an acute angle to the ground.

References Cited in the file of this patent

UNITED STATES PATENTS

| | | |
|---|---|---|
| 565,738 | Gilliland | Aug. 11, 1896 |
| 2,143,092 | Sloane | Jan. 10, 1939 |
| 2,179,937 | Lamp | Nov. 14, 1939 |
| 2,458,713 | Linderer | Jan. 11, 1949 |
| 2,661,585 | Hansen | Dec. 13, 1953 |